United States Patent [19]

Ono et al.

[11] Patent Number: 4,481,468
[45] Date of Patent: Nov. 6, 1984

[54] VELOCITY DETECTING APPARATUS HAVING A TWO-PHASE RESOLVER

[75] Inventors: Tadahiro Ono; Naoshi Miura, both of Shizuoka, Japan

[73] Assignees: Toshiba Kikai Kabushiki Kaisha; Toei Denki Kabushiki Kaisha, both of Tokyo, Japan

[21] Appl. No.: 363,525

[22] Filed: Mar. 30, 1982

[30] Foreign Application Priority Data

May 14, 1981 [JP] Japan .................................. 56-72720
May 14, 1981 [JP] Japan .................................. 56-72719

[51] Int. Cl.$^3$ ...................... G01P 3/46; G01P 13/00; G01P 3/52
[52] U.S. Cl. ..................................... 324/163; 324/165
[58] Field of Search ............... 324/160, 163, 175, 164, 324/165, 173

[56] References Cited

U.S. PATENT DOCUMENTS

| 3,811,091 | 5/1974 | Ha | 324/175 X |
| 3,819,268 | 6/1974 | Johnson | 324/175 X |
| 4,088,943 | 5/1978 | Schmidt | 324/163 |
| 4,228,396 | 10/1980 | Palombo | 324/163 |

FOREIGN PATENT DOCUMENTS

| WO82/0036- | | | |
| 92 | 10/1982 | PCT Int'l Appl. | 324/166 |
| 517848 | 6/1976 | U.S.S.R. | 324/166 |
| 662867 | 5/1979 | U.S.S.R. | 324/166 |

Primary Examiner—Stanley T. Krawczewicz
Assistant Examiner—Jose M. Solis
Attorney, Agent, or Firm—Cushman, Darby & Cushman

[57] ABSTRACT

A velocity detecting apparatus using a resolver, and more specifically, a two-phase resolver which rotor is connected to a rotary drive means such as a motor, a source for exciting the primary windings of the resolver, a wave shaper which produces a square wave of the same period and phase as the output signal produced by the secondary windings of the resolver, a phase discriminator which rectifies the output signal of the wave shaper, a low pass filter for producing a triangular wave from the output signal of the phase discriminator and a circuit for producing a signal corresponding to the absolute value of the slope of the triangular wave.

22 Claims, 14 Drawing Figures

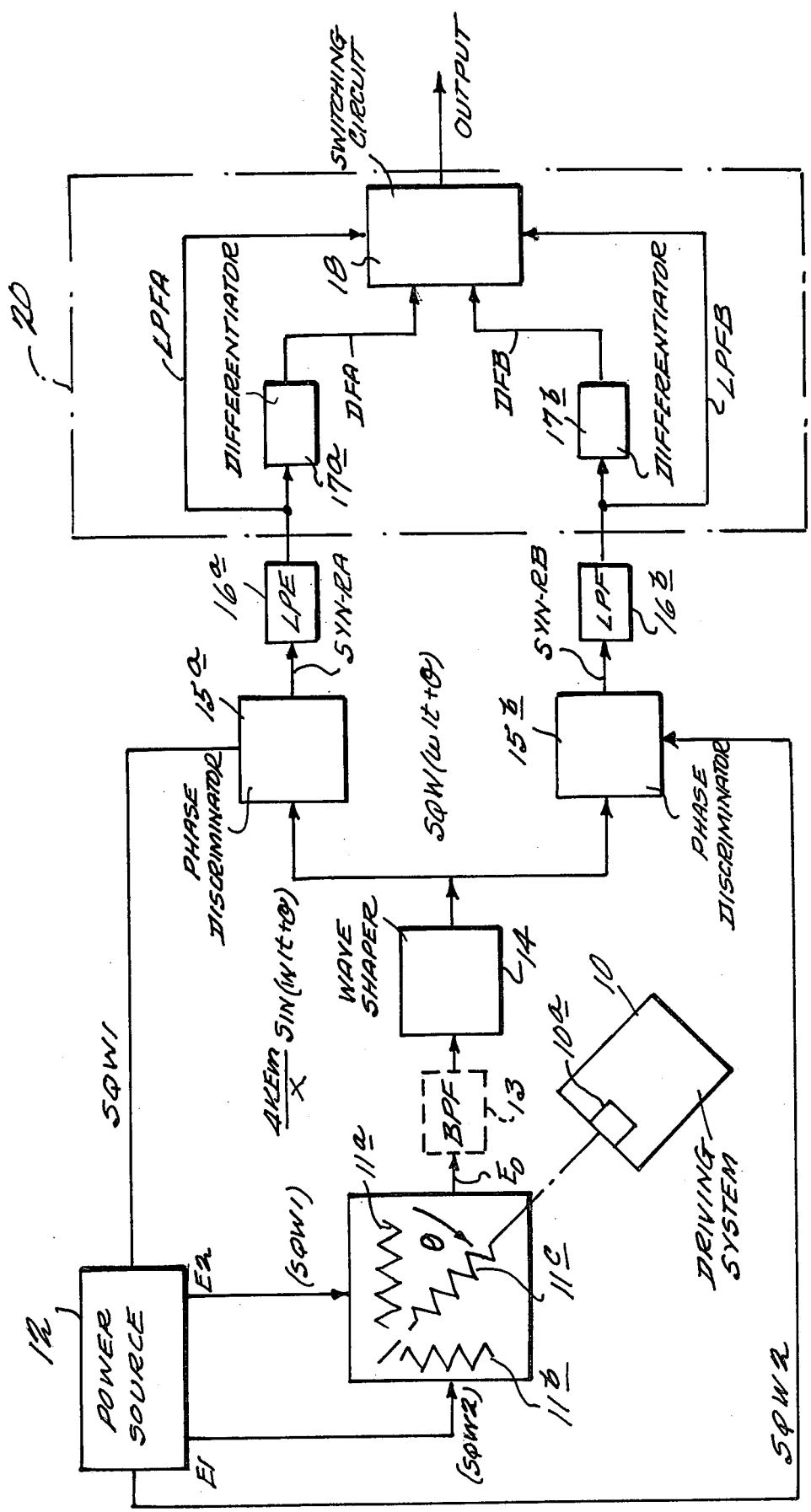
F I G. 1

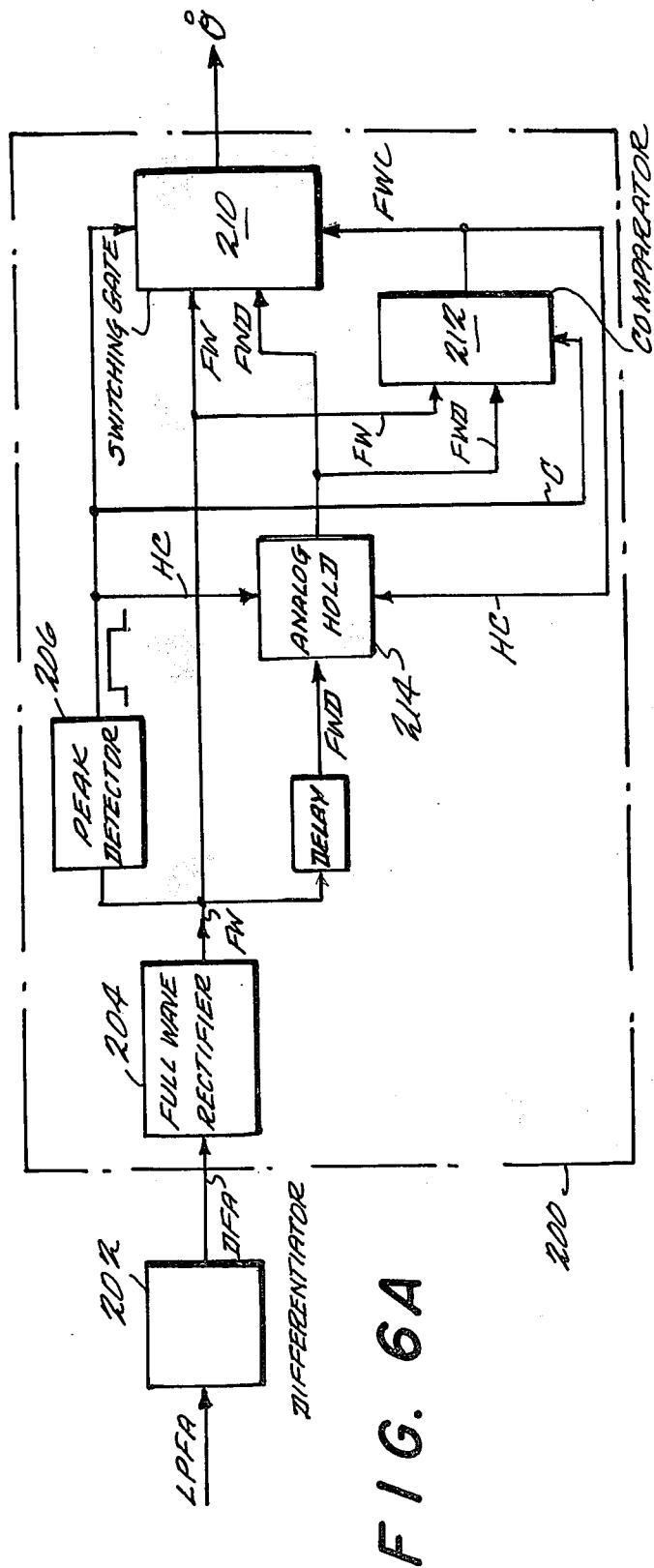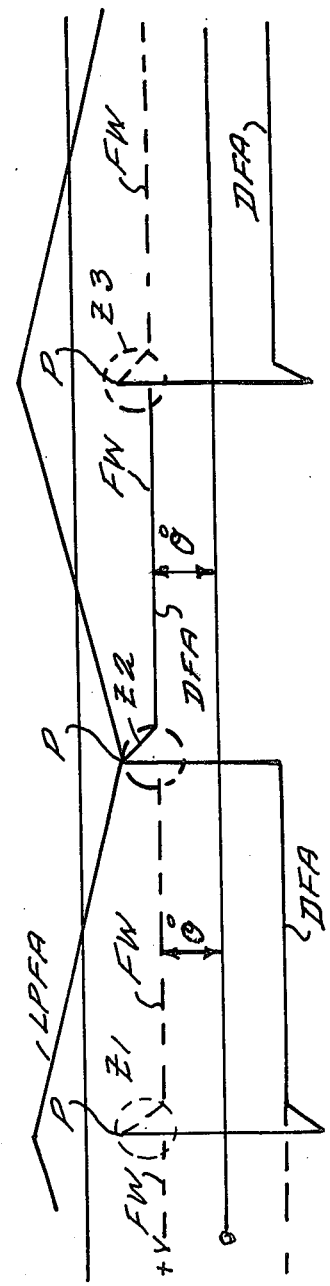

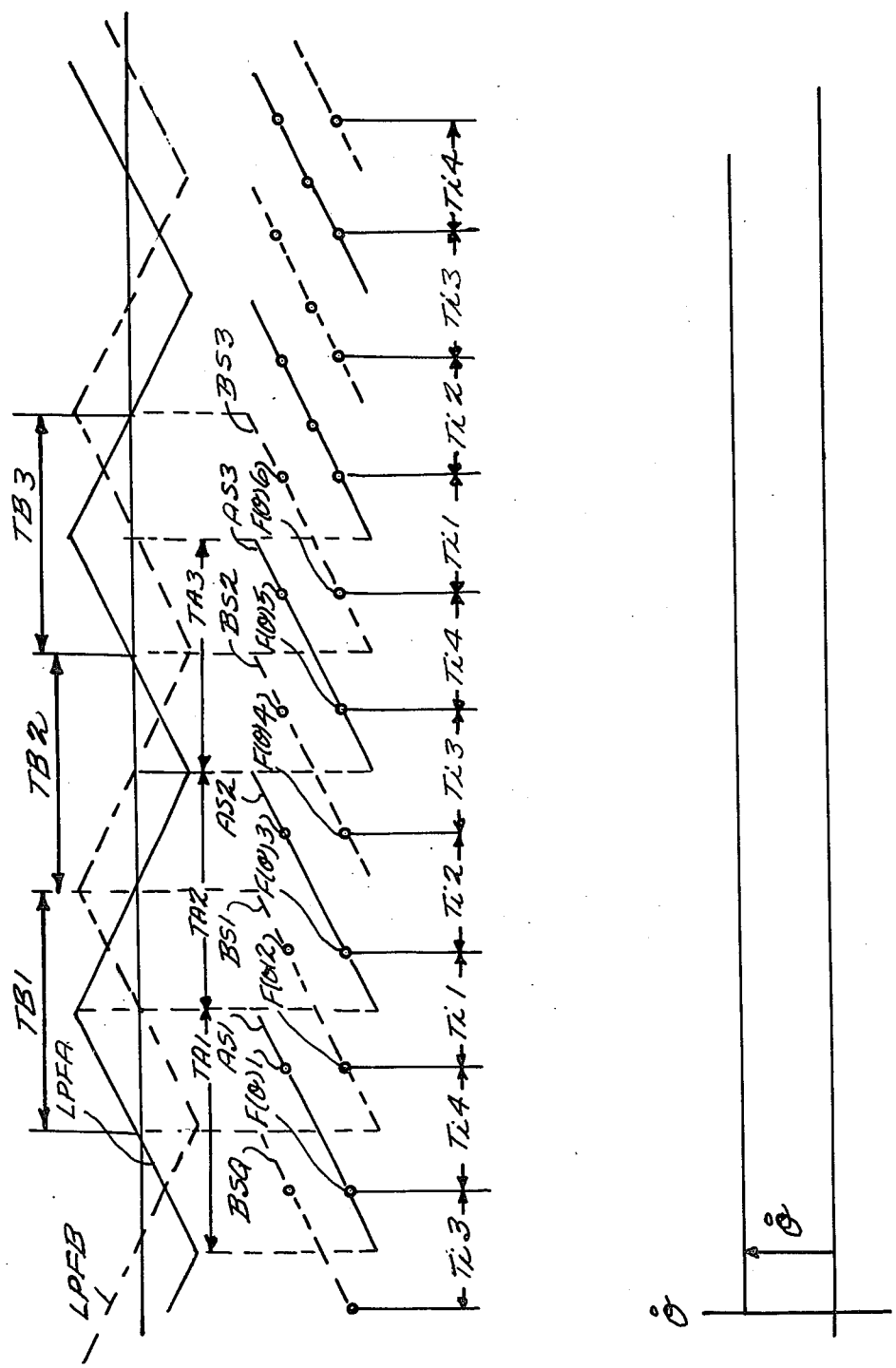

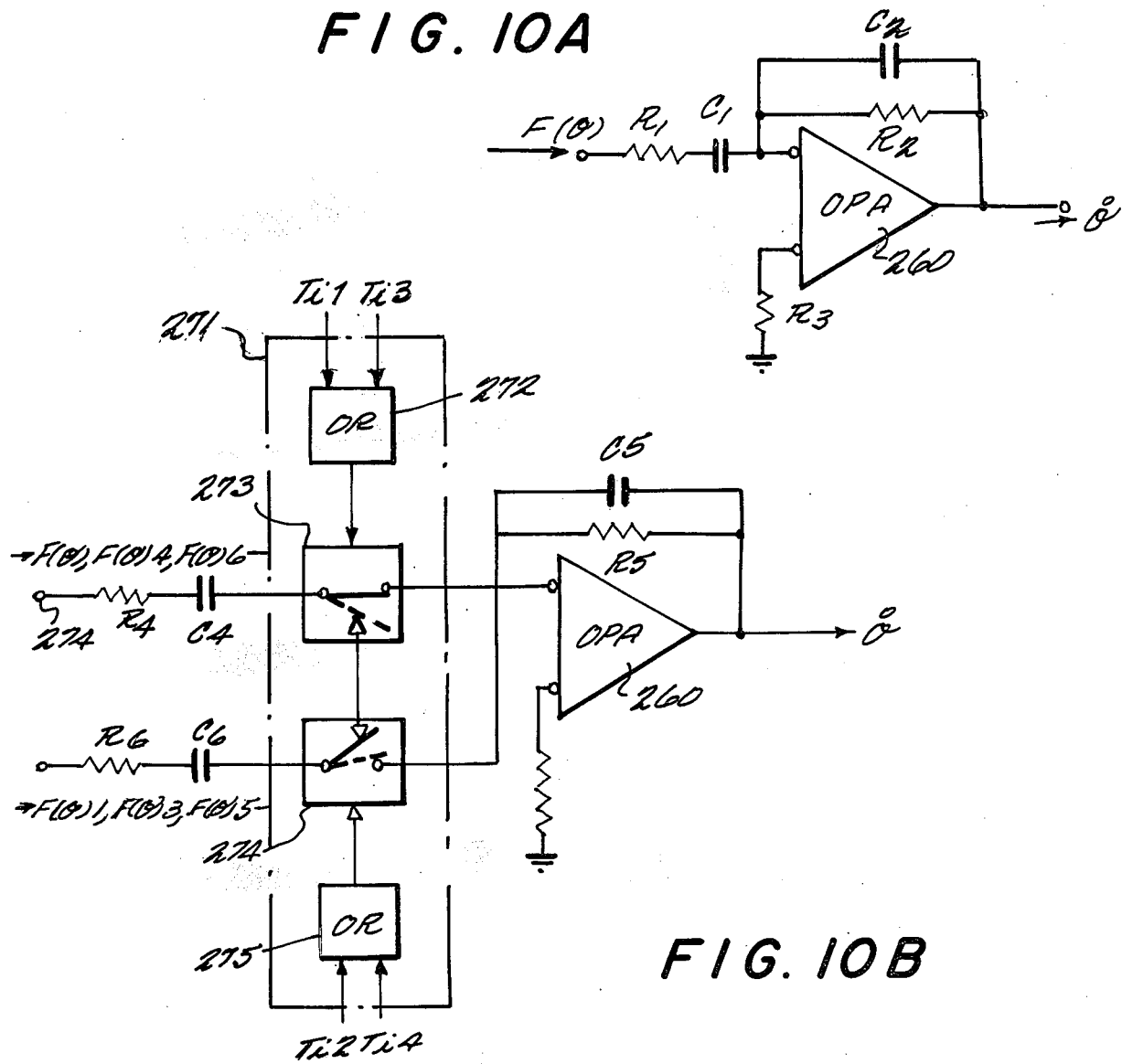
FIG. 10A
FIG. 10B
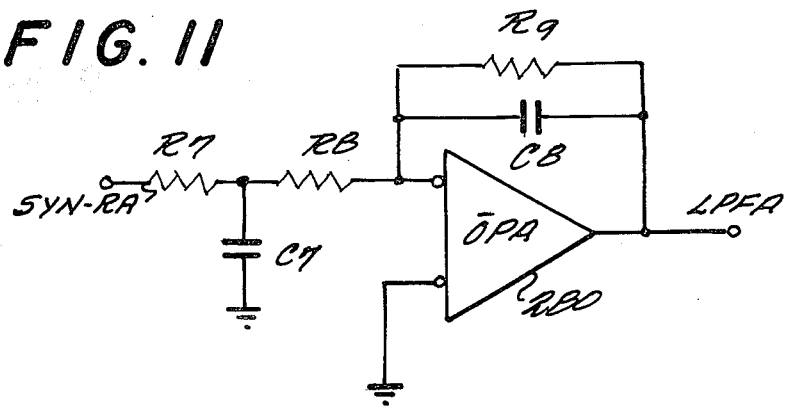
FIG. 11

VELOCITY DETECTING APPARATUS HAVING A TWO-PHASE RESOLVER

BACKGROUND OF THE INVENTION

The present invention relates to a velocity detecting apparatus having a two-phase resolver connected to a driving system.

DESCRIPTION OF THE PRIOR ART

In a conventional type of driving system for a machine tool on an industrial machine a motor drives the tools and a two-phase resolver is often provided for detecting the position of a driven body such as a feed screw, a table, or a suddle.

Furthermore, it is also necessary to detect the velocity of the driven body for controlling the stability thereof. Therefore, a detector, such as a tachometer generator (T.G.), is included which produces an output signal proportional to the rotational speed. Thus, two different detectors are needed to detect position and velocity, respectively, in each moving axis direction.

Moreover, the resolver, T.G. and the driving means in the driving system must be mechanically connected. Because of a brush mounted on the T.G., it is sometimes necessary to adjust it and to carry out maintenance on it. Even if a brushless motor or induction motor is used as a driving means, maintenance and adjustment for the T.G. is required.

SUMMARY OF THE INVENTION

Accordingly it is a primary object of the present invention to provide an electrical processing apparatus which converts a signal given by the resolver to a velocity signal, whereby the necessity of the T.G. in the driving system is eliminated.

Another object of the present invention is to provide another electrical processing device which is simpler than that above-mentioned arrangement.

According to this invention, these objects can be accomplished by providing an electrical processing apparatus which comprises a wave shaper for shaping the secondary output signal of the resolver, a phase discriminator connected to the wave shaper, a low pass filter connected to the phase discriminator and a combination of a differentiator in time and a switching circuit.

BRIEF DESCRIPTION OF THE DRAWINGS

FIG. 1 is a block diagram of the control circuitry of a velocity detecting device according to first embodiment of the present invention;

FIGS. 6A and 6B show another block diagram of circuitry corresponding to the circuit shown in FIG. 3, and waveforms produced thereby, respectively;

FIGS. 9A and 9B illustrate input and output signal waveforms in the differentiator shown in FIG. 7;

FIGS. 10A and 10B show a circuit diagram of a differentiator as shown in FIGS. 1 and 7, and FIG. 11 shows a circuit diagram of a low pass filter shown in FIGS. 1 and 7.

DESCRIPTION OF THE PREFERRED EMBODIMENT

Figure 2:
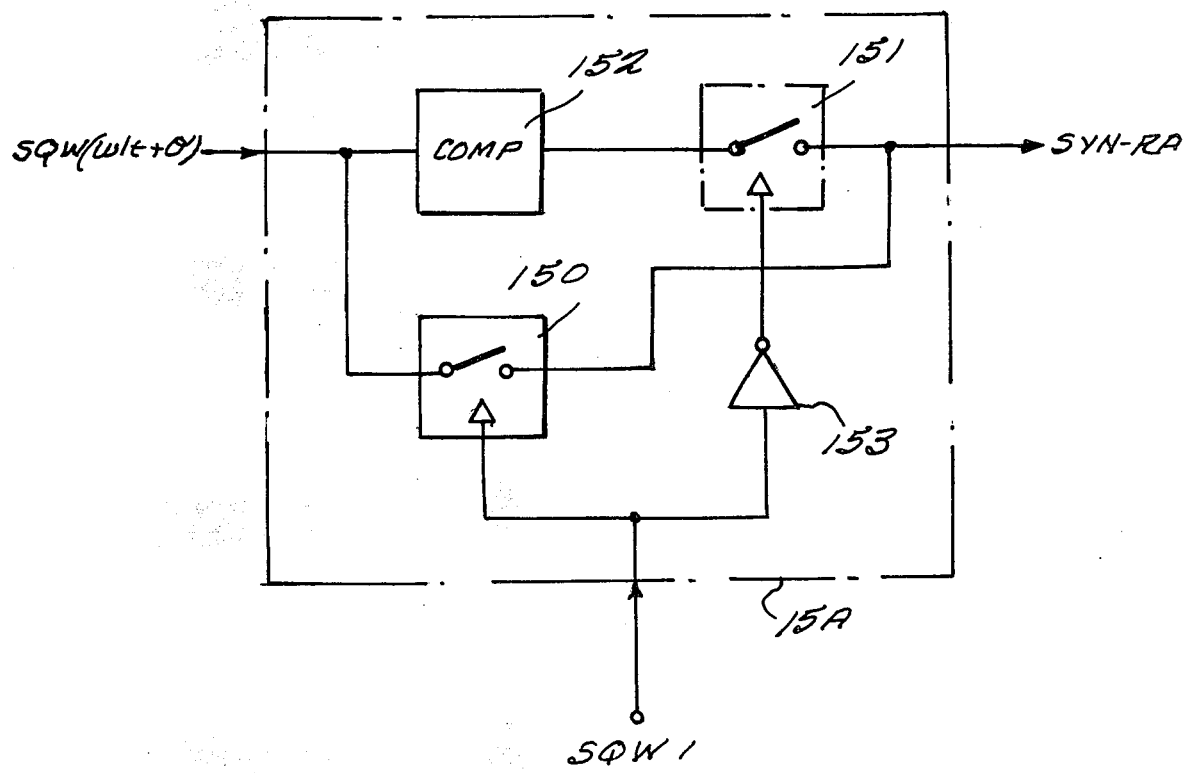
FIG. 2 is a detailed block diagram of a phase discriminator as shown in FIG. 1.

Referring to FIG. 1, a sine winding 11A and cosine winding 11B forming the primary winding of a two phase resolver 11 are connected to an exciting power source 12 so that sinusoidal waves E1 and E2 or square waves SQW1 and SQW2 representing exciting voltage signals are provided on the windings 11A and 11B, respectively, from the exciting power source 12. A secondary winding 11C of the resolver 11 is mounted on a rotor which is mechanically connected to a rotary drive 10a, for instance, a conventional motor, in a driving system 10. The rotational angular position of the rotor from a certain reference angle position is indicated as $\theta$.

When the magnetic coupling factor between the rotor and a stator connected integrally with the primary windings is assumed to be K, an output voltage $E_o$ given from the secondary winding 11C of the resolver 11 is:

$$E_o = K(E_1 \cos\theta + E_2 \sin\theta) \quad (1)$$

wherein:

$$E_1 = E_m \sin\omega_1 \cdot t \quad (2)$$

$$E_2 = E_m \cos\omega_1 \cdot t \quad (3)$$

By substituting the equations (2) and (3) into the equation (1), there is obtained:

$$E_o = KE_m \sin(\omega_1 \cdot t + \theta) \quad (4)$$

When square waves SQW1 and SQW2 are used instead of the equations (2) and (3), $E_1$ and $E_2$ are given as the following:

$$E_1 = \frac{4 E_m}{\pi} \sum_{n=1}^{\infty} \frac{1}{2n-1} \cdot \sin[(2n-1)\omega 1 \cdot t] \quad (5)$$

$$E_2 = \frac{4 E_m}{\pi} \sum_{n=1}^{\infty} \frac{1}{2n-1} \cdot \cos[(2n-1)\omega 1 \cdot t] \quad (6)$$

$$E_0 = \frac{4 E_m}{\pi} \sum_{n=1}^{\infty} \frac{1}{2n-1} \cdot \sin[(2n-1)(\omega 1 \cdot t + \theta)] \quad (7)$$

Band pass filter 13 removes only the fundamental wave component in the equation (7), namely $(4KE_m/\pi)\cdot\sin(\omega_1\cdot t+\theta)$. Therefore, in case signals $E_1$ and $E_2$ are used, filter 13 is not necessary.

Conventional wave shaper 13 produces a square wave of the same period and phase as the output voltage $E_o$ of the resolver 11, for instance, by a logical comparison of the output voltage $E_o$ with a zero volt potential by means of a comparator (not shown) which may be a zero crossing comparator.

Phase discriminators, 15A and 15B, more particularly synchronous rectifiers, receive square wave $SQW(\omega_1\cdot t+\theta)$ and provide a rectified output signal. Square waves SQW1 and SQW2 are also applied to the phase discriminators as rectifying or reference signals, respectively.

Low pass filters 16A and 16B convert the rectified signals SYN·RA and SYN·RB to the triangular wave signals LPFA and LPFB by filtering. Low pass filters 16A and 16B remove the frequency $f1(\omega_1=2\pi f1)$ of the exciting voltage signal and higher frequency components from the waveform of rectified signals SYN·RA and SYN·RB. To this end, assuming $\theta=\omega_2\cdot t=2\pi f2\cdot t$ and considering $\omega_1/\omega_2=f1/f2$ in $SQW(\omega_1+\omega_2)t$, if the rotor of the resolver 11 is at a maximum revolution of 3000 rpm (rotation per minute), then $f2=3000/60=50(1/sec)$, and if $f1=5$ KHz, then $f1/f2=5000/50=100$ and thus the removal of the f1 component by filtering is fully attainable.

A circuit diagram of low pass filter 17A, which is equal to low pass filter 17B, is shown in FIG. 11.

Figure 4:
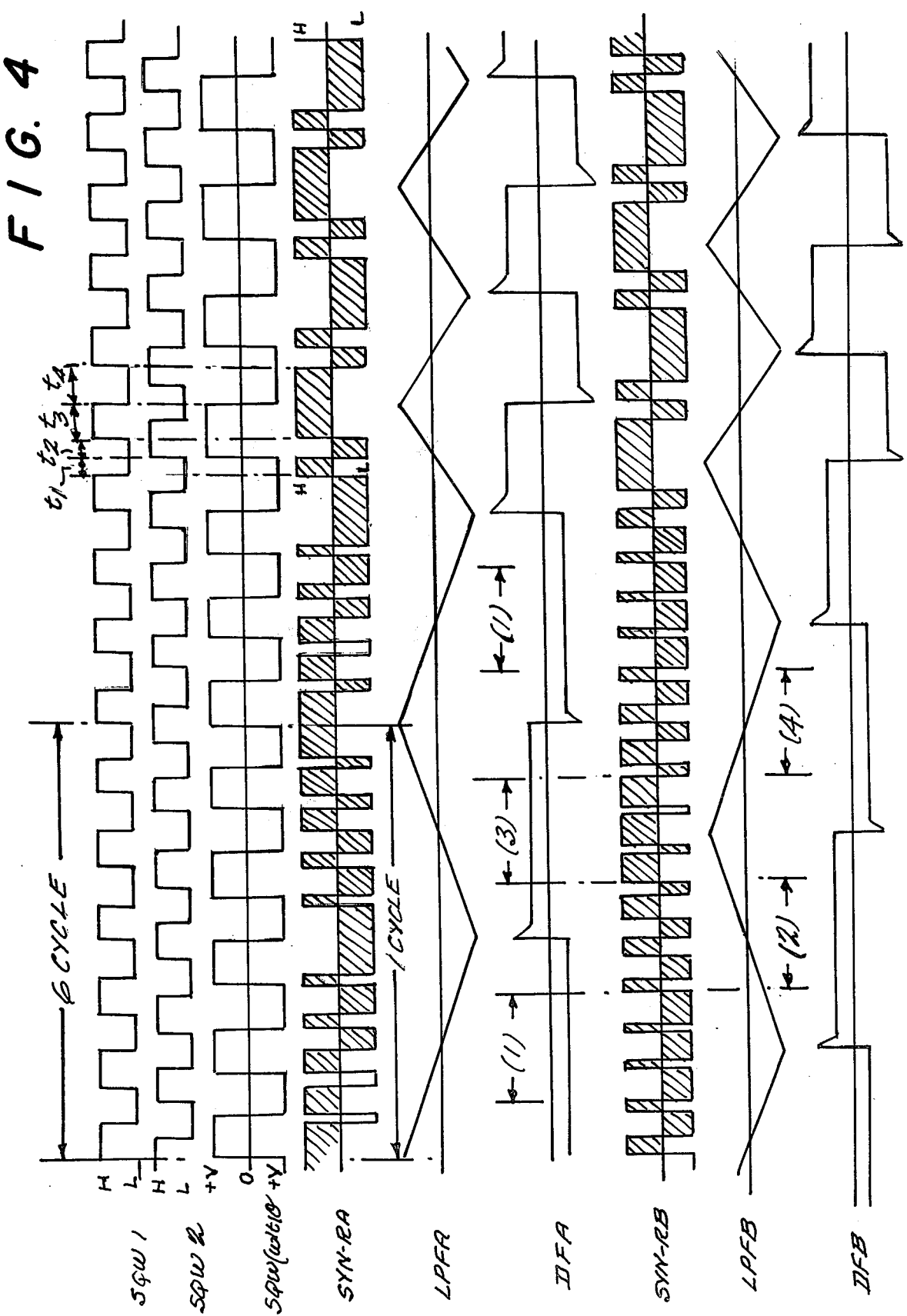
FIG. 4 illustrates the waveforms of signals indicated in the block diagram of FIG. 1.

In the signal waveform $SQW(\omega_1\cdot t+\theta)$ shown in FIG. 4, the value of $\omega_1/\omega_2$ in $\theta=\omega_2\cdot t$ is assumed to be 6 to make it easier to see the entire variation of one cycle. The circuitry 20 produces a signal $\theta$ corresponding to the absolute value of the slope of the triangular wave. Differentiators 17A and 17B differentiate in time the signals LPFA and LPFB, respectively. If the angular velocity of the rotor of the resolver 11 is assumed to be $\omega_2$, the gain of the differentiators are as follows:

$$G(j\omega_2)=|j\omega_2\cdot T| \quad (8)$$

where T is a time constant of the differentiators. (The circuit diagram of differentiator 17A, which is equal to differentiator 17B, is shown in FIG. 10A).

Thus the output of each differentiator is proportional to the angular velocity $\omega_2$ of the resolver 11.

A switching circuit 18 receives the output signals DFA and DFB, respectively, from the differentiators 17A and 17B. The triangular output waveforms are as mentioned above and shown as the signals LPFA, LPFB in FIG. 4. Therefore, the differentiators 17A and 17B produce an abnormal value at the bottom and the top of each triangle, that is, at the discontinuous point of the differential coefficient. Switching circuit means 18 is provided for blocking the output signals of the differentiators 17A and 17B at those points. More specifically, as shown in FIG. 4, the output signal $\theta$, which the switching circuit 18 produces is an inversion signal of DFA for the time interval (1), then a signal DFB for the time interval (2), a signal DFA for the time interval (3), and an inversion signal of DFB for the time interval (4). The time intervals (1), (2), (3), and (4) are determined as described hereinafter.

FIG. 2 represents a block diagram of the circuit of the phase discriminator 15A. Referring to FIG. 2, when the reference signal SQW1 is at a logical value "1" (H-Level), a switch 150 turns on allowing the input signal $SQW(\omega_1\cdot t+\theta)$ to pass through line and to become the output signal SYN·RA. On the other hand, when the signal SQW1 is at a logical value "0" (L-Level), the switch 150 assumes a blocking state and a switch 151 is turned ON through an inverter 153.

Comparator 152 is provides an inverted output of the input signal $SQW(\omega_1\cdot t+\theta)$. Consequently, when the reference signal SQW1 is at L-Level, the output SYN·RA coincides with an inverted waveform of the input signal $SQW(\omega_1\cdot t+\theta)$. Thus, circuit 15A forms a full wave synchronous rectifier.

Figure 3:
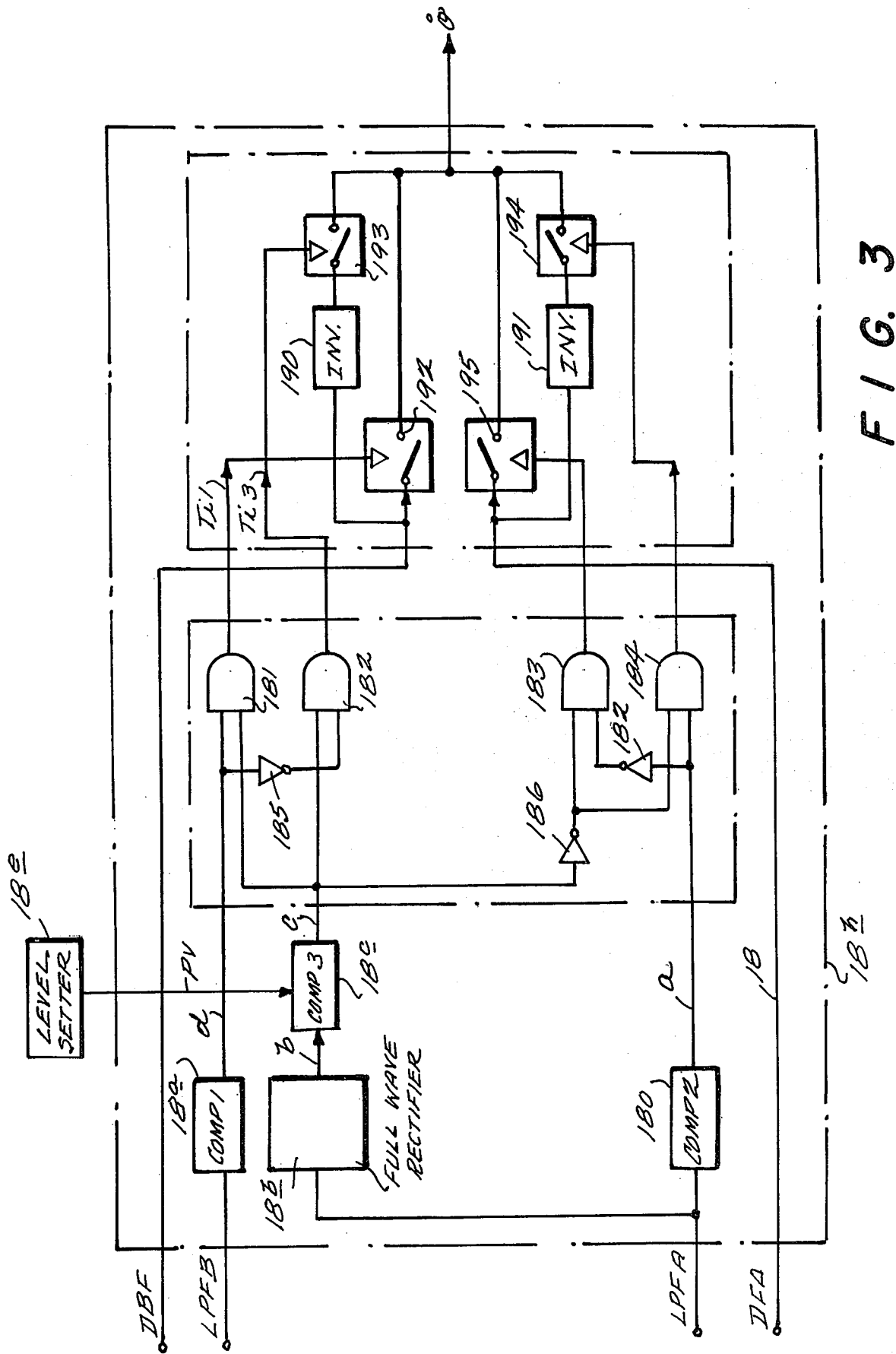
FIG. 3 illustrates the details of a switching circuit as shown in FIG. 1.
Figure 5:
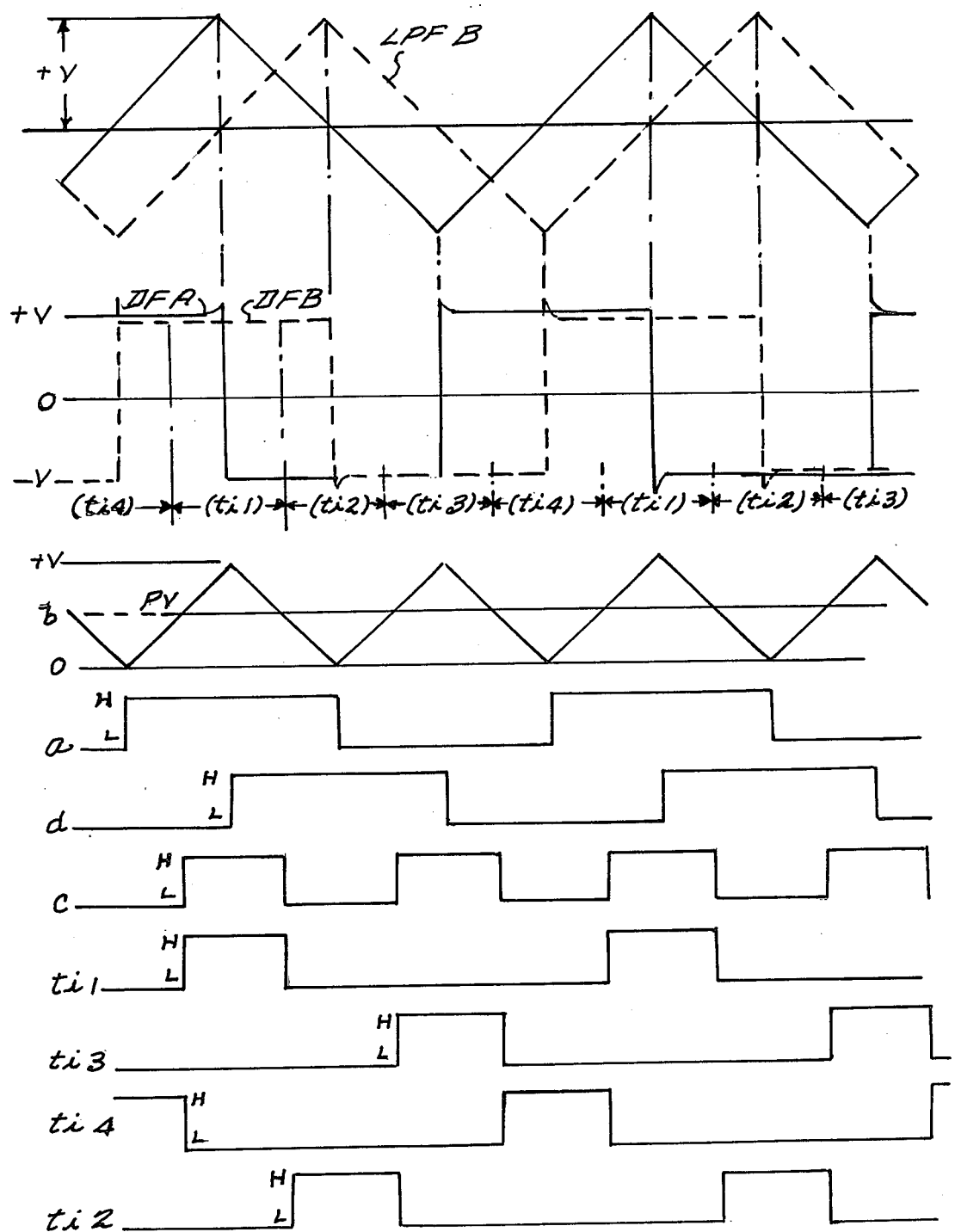
FIG. 5 illustrates the waveforms of signals indicated in the switching circuit of FIG. 3.

FIG. 3 illustrates more details of the switching circuit 18, including a comparator 18A which produces an output signal having a logical value "1" (H-Level) for only the time interval of the positive voltage waveform in the low pass filter output waveform LPFB shown in FIGS. 4 and 5. This output state is shown as waveform "d" in FIG. 5.

A second comparator 18D produces an output signal having a logical value "1" (H-Level) for only the time interval of the positive waveform in the low pass filter output waveform LPFA shown in FIGS. 4 and 5. This output state is shown as a waveform "a" in FIG. 5. A third comparator 18C compares a set value "PV" provided by a level setter 18E with the input "b", and for the time interval of b>PV an output signal is produced as a logical value "1" (H-Level). This output state is shown as a waveform "c" in FIG. 5. A gate circuit 18G provides timing signals, which control time intervals, Ti1, Ti3, Ti4 and Ti2 to a selective switching section 18H. AND gates 181, 182, 183 and 184 and inverters 185, 186, 187 provide the logic.

Each signal Ti1~Ti4 is logically expressed as follows:

Ti1=d·c

Ti3=d̄·c

Ti4=c̄·a

Ti2=c̄·ā

In the selective switching section 18H, inverters 190 and 191 invert the input signals DFA and DFB, respectively. Switches 192, 193, 194 and 195 are rendered conductive respectively when logical values of the signals Ti1, Ti3, Ti2 and Ti4 are at H-Level.

Referring to each waveform in order from the top of FIG. 4, the waveform of signal SQW1 has a phase difference by 90° or $\pi/4$ to that of signal SQW2, and signal $SQW(\omega_1\cdot t+\theta)$ represents the square wave of the same period and phase as the output voltage $E_o$ of the resolver 11, shown in FIG. 1.

The waveform of signal SYN·RA represents the output waveform obtained by the phase discriminator 15A to which the signal SQW1 is applied as a reference or rectifying signal. Each shaded area of the waveform of signal SYN·RA is obtained by logical operation among signals SQW1 and $SQW(\omega_1\cdot t+\theta)$, as follows:

| SYN·RA | SQW1 | $SQW(\omega_1\cdot t + \Theta)$ |
|---|---|---|
| H | L | L |
| L | H | L |
| L | L | H |
| H | H | H |

For example, for the time interval t1 in FIG. 4, the logical values of signals SQW1 and $SQW(\omega_1\cdot t+\theta)$ are both low level, so the logical value of signal SYN·RA is at high level. For next time interval t2, the logical values of SQW1 and $SQW(\omega_1\cdot t+\theta)$ are low and high, respectively, so the logical value of signal SYN·RA is high, and for the time interval t4, the logical values of SQW1 and $SQW(\omega_1\cdot t+\theta)$ are both low, so SYN·RA is high.

The waveform of signal LPFA represents the results of filtering by using low pass filter 16A, and the waveform of signal DFA represents the results of differentiating by using differentiator 17A.

The waveforms of signals SYN·RB, LPFB and DFB correspond to SYN·RA, LPFA and DFA except using not signal SQW1 but signal SQW2. Furthermore, in FIG. 4, there is a little difference in waveform between SYN·RA and SYN·RB even if their phases are made the same, but this is because the ratio of $\omega_2$ to $\omega_1$ was set to a relatively large value of 1/6 as previously noted. If $\omega_2/\omega_1 = 1/100$, the waveforms of both signals become nearly the same.

FIG. 5, as previously noted, illustrates time changes of the main signals shown in FIG. 3. Referring to each waveform in order from the top of FIG. 5, first is shown the waveforms of signal LPFA. LPFA is the output of low pass filter 16A and next in dashed lines the waveform of signal LPFB which is the output of low pass filter 16B, the signal LPFA preceding LPFB by 90° in phase. The waveforms of signal DFA and DFB which are the output signals of the differentiators 17A and 17B differentiating the signal LPFA and LPFB, are also shown by actual and dashed lines, respectively.

Time intervals (Ti4), (Ti1), (Ti2), (Ti3), (Ti4), (Ti1), (Ti2) and (Ti3) beneath the waveforms of signal DFA and DFB, each corresponds to one of the signals Ti1∼Ti4 illustrated on the lower part of FIG. 5, respectively, which causes the signal DFA to be able to pass the gates 194 or 195, and the signal DFB to pass the gate 192 or 193. shown in FIG. 3. More specifically, for example, for the time interval (Ti1), since the logical value of the signal Ti1 is high level, the signal DFB can pass the gate 192. For the time interval (Ti2), since the logical value of the signal Ti2 is high level, the signal DFA can pass the gate 194 after being inverted by comparator 191, for the time interval (Ti3), since the logical value of the signal Ti3 is high level, so the signal DFB can pass the gate 193 after being inverted by comparator 190 and for the time interval (Ti4), since the logical value of the signal Ti4 is high level, so the signal DFA can pass the gate 195, respectively.

There are also shown the signals b, a, d, and c in the middle parts of FIG. 5, signal c is being formed by signal b and voltage signal $\overline{PV}$ given by setter 18E, and the waveform of each signal Ti1∼Ti4 being formed by combinations among signals a, d, and c. The setting voltage signal PV is, in this case, preferably set at the value $\frac{1}{2}$PV, so that each time interval of signals Ti1∼Ti4 is equal to, $\pi/4$ in phase angle.

Consequently, it is possible to obtain an angular velocity signal $\dot\theta$ of the rotor mounted on resolver 11 without distortion by the abnormal values at the discontinuous points of the differential coefficients of signals LPFA, and LPFB.

FIGS. 6A and 6B show a graphical and schematic representation of another embodiment of the present invention. More specifically, this embodiment makes it possible to dispense with only one signal processing circuit group, namely, either one of circuit groups 15A, 16A and 17A or 15B, 16B and 17B shown in FIG. 1.

Referring now to the circuit diagram illustrated in FIG. 6A, switching circuit 200 receives signal LPFA produced in the same way as signal LPFA in FIG. 1 and connects to differentiator 202, and produces the angular velocity signal $\dot\theta$.

Full wave rectifier 204 rectifies output signal DFA of differentiator 202 and produces output signal FW. The output signal FW is applied to peak value detector 206, delay circuit 208, switching gate 210 and comparator 212, respectively.

Peak value detector 206 detects a peak point P shown at the dotted circle Z1, in FIG. 6B, to produce command signal HC which is applied to an analog hold circuit 214, FWD select command signal FWDC which is applied to switching gate 210, and clear command signal CC which is applied to comparator 212. Those signals may be timing signal.

Delay circuit 208 supplies to the circuit 214 signal FWD which is delayed by a predetermined time interval from signal FW. Circuit 214 supplies the delayed signal FWD to switching gate 210 and to comparator 212 only when hold command signal HC is produced by peak detector 206.

Switching gate 210 switches signal FW to FWD when the signal FWDC is produced by peak detector 206. Comparator 212 compares the value of signal FW with that of signal FWD after signal CC is produced by peak detector 206 and when each value coincides, comparator 212 produces signal FWC which is applied to switching gate 210 to switch signal FWD to signal FW, and signal HC to analog hold circuit 214 so as to cancel the signal HC. Furthermore, in an appropriate condition, it is possible to eliminate the analog hold circuit 214 and to apply signal FWD to switching gate 210 and comparator 212 directly. This can be done if the delay time interval is a little longer than the time interval between signal FWDC and FWC.

The waveforms of these signals are illustrated in FIG. 6B, namely signals LPFA, DFA and FW, more specifically, signal FW corresponding to angular velocity $\dot\theta$ (shown by dashed line in a range in which the voltage value of signal DFA, is minus as shown in FIG. 6B). Each dashed circle Z1, Z2 and Z3 represents the peak area in which is included the peak point P.

According to such a circuit diagram as shown in FIG. 6B, it is possible to switch signal FW to quickly signal FWD by setting an appropriate delaying time interval in spite of peak area Z1, Z2 and Z3.

Figure 7:
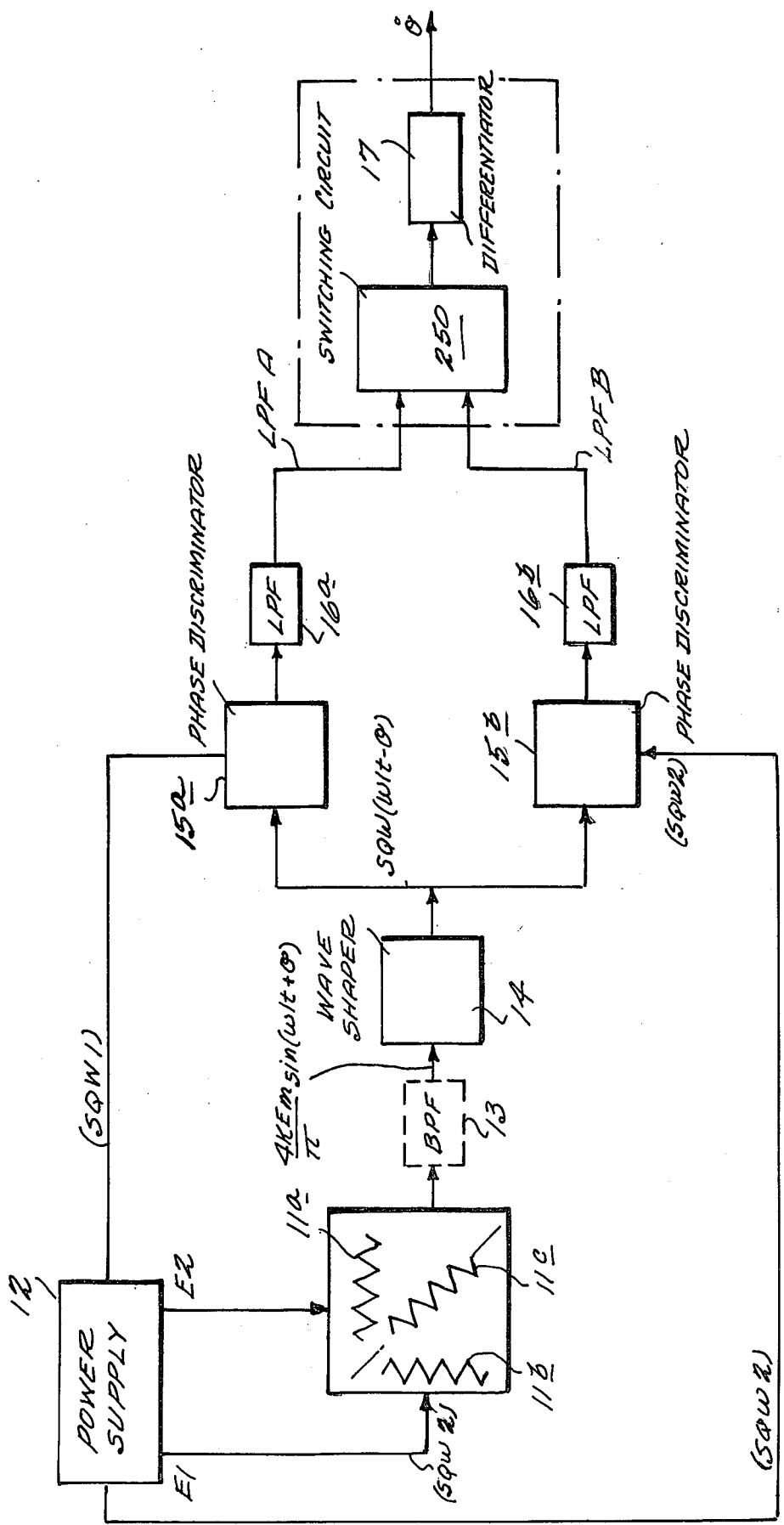
FIG. 7 is a block diagram of a control circuitry of a velocity detecting device according to a second embodiment of the present invention.

FIG. 7 shows a block diagram of another embodiment of the present invention, basically the same as FIG. 1 except for switching circuit 250 and differentiator 17. Circuit 25 provides the same functions as circuit 20 in FIG. 1. However, in this embodiment, the differentiator is connected after the switching circuit.

Figure 8:
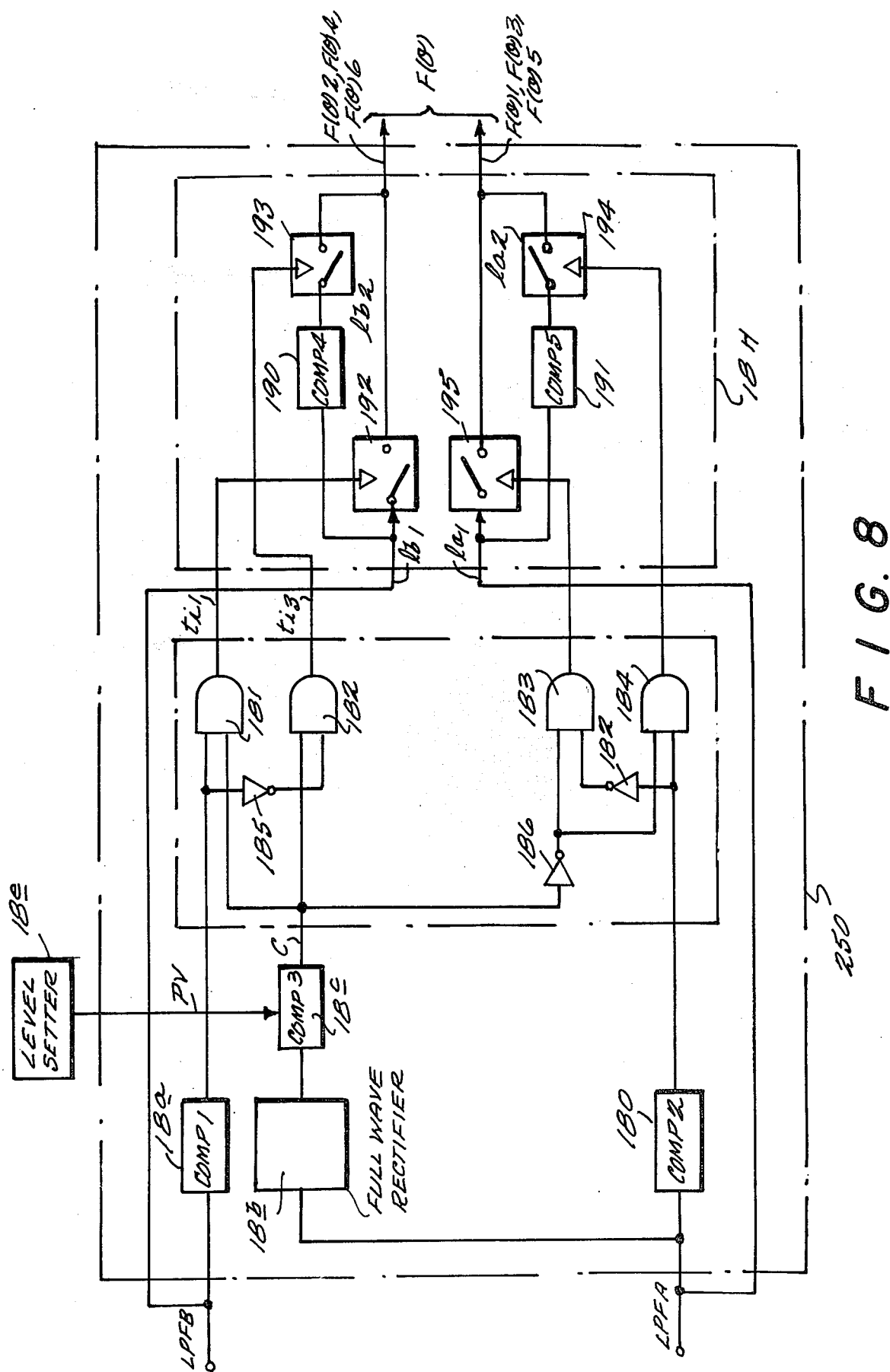
FIG. 8 illustrates the details of a switching circuit shown in FIG. 7.

FIG. 8 represents more detailed circuit diagram of the switching circuit shown in FIG. 7.

Referring now to FIG. 8, there is provided a switching circuit 250 which is equivalent to the circuit diagram 18 shown in FIG. 3 except that it provides a signal LPFA instead of signal DFA and provides a signal LPFB instead of signal DFB shown in FIG. 3. For convenience, each signal except F($\theta$), and numeral number of each element provided in switching circuit 250 coincides with those provided in switching circuit 18 shown in FIG. 3. In FIG. 8 output signal F($\theta$) of switching circuit 250 is basically formed by signal LPFA and LPFB.

FIG. 9A illustrates the waveforms of the signals shown in FIG. 8 and FIG. 9B a waveform of an angular velocity $\dot\theta$ given by the differentiator shown in FIG. 7.

Referring to the waveforms of signal LPFB, LPFA and the waveforms of signal BS1∼AS3 of FIG. 9A, signal LPFA advances in phase at $\pi/4$ ahead of LPFB as shown by dashed line. Signals AS1 and AS3 correspond to signals LPFA for the time intervals TA1 and TA3, respectively, which appear on the line $1a_1$ signal AS2 corresponds to the inversion of signal LPFA for the time interval TA2, which appears on the line $1a_2$.

Furthermore, signals BS1 and BS3 correspond to signal LPFB for the time intervals TB1 and TB3, respectively, which appear on the line $1b_1$, and the signal BS2 corresponds to the inversion of signal LPFB for the time interval TB2, which appears on the line $1b_2$.

Signal $F(\theta)1$ is the portion of signal AS1 corresponding to the time interval Ti4, signal $F(\theta)2$ is the portion of signal BS1 corresponding to the time interval Ti3. Further, signal $F(\theta)3$ is the portion of signal AS2 corresponding to the time interval Ti2. Signal $F(\theta)4$ is the portion of signal BS2 corresponding to the time interval Ti2, and signal $F(\theta)5$ is the portion of signal AS3 corresponding to the time interval Ti3, and so on.

The signals $F(\theta)1$, $F(\theta)2$, ... $F(\theta)5$ ... together form signal $F(\theta)$ which is applied to differentiator 17 shown in FIG. 10B.

Referring now to FIG. 9B, angular velocity signal $\dot{\theta}$ is in this FIGURE a constant value because each waveform or line portion of signal $F(\theta)1$, $F(\theta)2$, ... $F(\theta)5$, $F(\theta)6$ is parallel and has the same slope.

FIG. 10A shows a specified circuit diagram of the differentiator 18 shown in FIG. 1 including an operational amplifier 260. resistors R1, R2 and R3 and capacitors C1, and C2; therefore, the output $\dot{\theta}$ of the differentiator is as follows:

$$\dot{\theta} = - \frac{SC_1R_2}{(1 + SC_1R_1)(1 + SC_2R_2)} \cdot F(\theta)$$

wherein:
$R_1 = 15$ K$\Omega$
$R_2 = 300$ K$\Omega$
$C_1 = 0.01$ $\mu$F
$C_2 = 0.001$ $\mu$F
$S = d/dt$ or $\gamma\omega$ In FIG. 10A, register $R_1$ and capacitor $C_2$ are provided for eliminating high frequency noise.

FIG. 10B illustrates a circuit diagram of another differentiator having two input terminals 274, 275 for signal groups $F(\theta)1$, $F(\theta)3$, $F(\theta)5$, ..., and $F(\theta)2$, $F(\theta)4$, $F(\theta)4$, $F(\theta)6$, ..., respectively, shown in FIG. 8.

Gate circuitry 271 includes OR gates 272 and 275, and switching elements 273 and 274. When timing signal Ti1 or Ti3 is applied to the gate circuitry, switching element 273 is made conductive, so signal group $F(\theta)2$, $F(\theta)4$, $F(\theta)6$, ..., pass through register R4 and Capacitor C4 to the operational amplifier 270. On the other hand, when timing signal Ti2 or Ti4 is applied to the gate circuitry, switching element 274 is made conductive, so the other signal group $F(\theta)1$, $F(\theta)3$, $F(\theta)5$, ..., passes through register R6 and capacitor C6 to the operational amplifier 270.

The values of registers R4 and R6 are equal and the values of capacitors C4 and C6 are also equal. Furthermore, registers R4, R5 and capacitors C4, C5 correspond to the registers R1, R2 and capacitors C1, C2, respectively.

FIG. 11 illustrates a circuit diagram of low pass filter 16A shown in FIG. 1. Element 280 is an operational amplifier. The relation between input signal SYN·RA and output signal LPFA is as follows:

$$\frac{LPFA}{SYN \cdot RA} = - \frac{R_9}{2R_7} \cdot$$

$$\frac{1}{\left(1 + S \cdot C_7 \cdot \frac{R_7}{2}\right)(1 + SC_8 \cdot R_2)}$$

wherein:
$R_7 = R_8 = 10$ K$\Omega$
$C_7 = 0.047$ $\mu$F
$R_9 = 20$ K$\Omega$
$C_8 = 0.01$ $\mu$F, and
$S = d/dt$ or $\gamma\omega$ While a preferred embodiment has been described, variations thereto will occur to those skilled in the art within the scope of the present invention which are delineated by the following claims.

What is claimed is:

1. A velocity detecting apparatus which comprises:
    a two phase resolver having a primary and secondary winding and a rotor adapted to be connected to means for driving said rotor;
    means for exciting the primary windings of said resolver;
    wave shaping means for producing a square wave of the same period and phase as the output signal given by the secondary windings of said resolver;
    phase discriminating means for rectifying the output signal of said wave shaping means;
    low pass filter means for producing a triangular wave from the output signal of said phase discriminating means;
    means for producing a signal corresponding to the absolute value of the slope of said triangular wave and indicating the velocity of said rotor.

2. An apparatus as in claim 1, wherein said exciting means comprises a square wave generator which generates first and second square waves differing $\pi/4$ in phase.

3. An apparatus as in claim 1 or 2, wherein said wave shaping means includes a band pass filter.

4. An apparatus as in claim 1, wherein said phase discriminating means comprises:
    a comparator providing the inverted output of said wave shaping means;
    first switching means for passing the output of said comparator when one of said exciting means output is logically low; and
    second switching means for passing the output of said wave shaping means when the said one of said exciting means output is logically high.

5. An apparatus as in claim 1, wherein said signal producing means includes a differentiator.

6. An apparatus as in claim 5, wherein said differentiator comprises:
    an operational amplifier;
    an input circuit having a serially connected resistor and a capacitor connected to the inverting input gate of said operational amplifier; and
    a feedback circuit having a parallel connected resistor and capacitor, the feedback circuit being connected between the output side of said operational amplifier and the input gate of said operational amplifier.

7. A velocity detecting apparatus which comprises:
    a two-phase resolver having a primary and a secondary winding and a rotor adapted to be connected to means for driving said rotor;

an exciting means for primary windings of said resolver;

wave-shaping means for producing a square wave of the same period and phase as the output signal given by the secondary windings of said resolver;

phase discriminating means for rectifying the output signal of said wave shaper;

low pass filter means for producing a triangular wave from the output of said phase discriminating means;

differentiating means for differentiating in time said triangular wave;

means for producing a signal corresponding to the absolute value of the slope of said wave except its peak and bottom portions.

8. An apparatus as in claim 7, wherein said producing means comprises:

means for generating timing signals; and switching means for switching the output signal of said differentiating means in accordance with said timing signals.

9. An apparatus as in claim 8, wherein said timing signal generating means comprises:

a first comparator producing an output signal having a logical value "1" for only the time interval of positive voltage in the low pass filter means output;

a full wave rectifier rectifying the output signal of said low pass filter means;

a level setter;

a second comparator which produces a signal having a logical value "1" by comparing a signal given by said level setter with the output signal given by said full wave rectifier; and a gate circuit to which are applied the output signals of said first and second comparators.

10. An apparatus as in claim 9, wherein said level setter is adjustable.

11. An apparatus as in claim 10, wherein said setting level is set at the half of the amplitude of said low pass filter output.

12. An apparatus as in claim 8 or 9, wherein said switching means comprises:

a first gate circuit which passes the output signal of said differentiating means when one of said timing signals is applied thereto;

a comparator which produces the inverted signal of the output signal of said differentiating means;

a second gate circuit which passes the inverted signal when said another one of timing signals is applied thereto.

13. An apparatus as in claim 7, wherein said producing means comprises:

a full wave rectifier for rectifying the output signal of said differentiating means; and means for removing the peak portions of the full wave rectifier, which corresponds to the peak and bottom portions of said triangular wave.

14. An apparatus as in claim 13, wherein said removing means comprises:

peak detecting means for detecting the peak of the output of said full wave rectifier;

delay circuit means for delaying the output of said full wave rectifier by a predetermined time interval;

hold circuit means for holding the signal given by said delay circuit when said peak detecting means detects a peak value;

switching gate means for switching the output of said full wave rectifier to the held signal of said hold circuit when said peak detecting means detects a peak value; and a comparator which produces a signal representing a reset signal to said switching gate means and to said hold circuit means when the value of the output signal of said full wave rectifier coincides with that of the held signal after the peak detecting signal is generated.

15. An apparatus as in claim 13, wherein said removing means comprises:

peak detecting means for detecting the peak of the output of said full wave rectifier;

delay circuit means for delaying the output of said full wave rectifier by a predetermined time interval;

switching gate means for switching the output of said full wave rectifier to the output of said delay circuit means when said peak detecting means detects a peak value; and a comparator for producing a reset signal to said switching gate means when the value of the output signal of said full wave rectifier coincides with that of the output signal after the peak detecting signal is generated.

16. A velocity detecting apparatus which comprises:

a two-phase resolver having a primary and secondary winding and a rotor adapted to be connected to means for driving said rotor;

means for exciting the primary windings of said resolver;

wave shaping means producing a square wave having the same period and phase as the output signal given by the secondary windings of said resolver;

phase discriminating means for rectifying the output signal of said wave shaping means;

low pass filter means for producing a triangular wave;

means for producing a further signal with each rising side and falling side of said triangular wave except its peak and bottom portions;

means for processing said further signal so that both said rising and falling sides have the same sign of slope; and means for differentiating said further signal.

17. An apparatus as in claim 16, wherein said further signal producing means comprise:

means for generating timing signals; and means for switching the output signal of said low pass filter means in accordance with said timing signals.

18. An apparatus as in claim 17, wherein said timing signal generating means comprise:

a first comparator producing an output signal having a logical value "1" for only the time interval of positive voltage in the low pass filter means output;

a full wave rectifier rectifying the output signal of said low pass filter means;

a level setter;

a second comparator which produces a signal having logical value "1" by comparing a signal given by said level setter with the output signal given by said full wave rectifier; and a gate circuit to which are applied the output signals of said first and second comparators.

19. An apparatus as in claim 18, wherein said level setter is adjustable.

20. An apparatus as in claim 19, wherein said setting level is set at the half of the amplitude of said low pass filter output.

21. An apparatus as in claim 17 or 18, wherein said switching means comprises:
- a first gate circuit which passes the output signal of said low pass filter means when one of said timing signals is applied thereto;
- a comparator which produces the inverted signal of the output signal of said low pass filter means;
- a second gate circuit which passes the inverted signal when another one of said timing signals is applied thereto.

22. An apparatus as in claim 17 or 18, wherein said differentiator comprises:
- an operational amplifier;
- a feedback circuit having a register and capacitor in parallel connection, being connected between the input terminal and output terminal of the operational amplifier;
- two input circuits, each having a register and a capacitor in serial connection;
- a gate means responsive to said timing signals to pass an input signal group applied through said each input circuit to the input terminal of said operational amplifier.

* * * * *